(12) United States Patent
Rahmatian

(10) Patent No.: US 11,334,724 B1
(45) Date of Patent: May 17, 2022

(54) TEXT-BASED EGOTISM LEVEL DETECTION SYSTEM AND PROCESS FOR DETECTING EGOTISM LEVEL IN ALPHA-NUMERIC TEXTUAL INFORMATION BY WAY OF ARTIFICIAL INTELLIGENCE, DEEP LEARNING, AND NATURAL LANGUAGE PROCESSING

(71) Applicant: Mahyar Rahmatian, San Carlos, CA (US)

(72) Inventor: Mahyar Rahmatian, San Carlos, CA (US)

( * ) Notice: Subject to any disclaimer, the term of this patent is extended or adjusted under 35 U.S.C. 154(b) by 0 days.

(21) Appl. No.: 17/508,694

(22) Filed: Oct. 22, 2021

(51) Int. Cl.
| | |
|---|---|
| *G06F 40/30* | (2020.01) |
| *G06F 40/279* | (2020.01) |
| *G06F 40/56* | (2020.01) |
| *G06N 3/04* | (2006.01) |

(52) U.S. Cl.
CPC ............ *G06F 40/30* (2020.01); *G06F 40/279* (2020.01); *G06F 40/56* (2020.01); *G06N 3/04* (2013.01)

(58) Field of Classification Search
CPC .... G06F 40/211; G06F 40/253; G06F 40/268; G06F 40/284; G06F 40/30; G06F 40/295; G06N 20/00
See application file for complete search history.

(56) References Cited

U.S. PATENT DOCUMENTS

| | | | | |
|---|---|---|---|---|
| 6,587,846 B1* | 7/2003 | LaMuth | ................. | G06N 3/004 706/21 |
| 7,236,963 B1* | 6/2007 | LaMuth | ................... | G06N 5/04 706/45 |
| 9,788,777 B1* | 10/2017 | Knight | ..................... | G10L 25/63 |
| 10,686,600 B1* | 6/2020 | Vo | ........................... | H04L 63/105 |
| 10,957,306 B2* | 3/2021 | Chen | ........................ | G10L 25/63 |
| 10,984,034 B1* | 4/2021 | Sandland | ............... | G10L 15/183 |
| 11,106,751 B1* | 8/2021 | Kadayam | ............. | G06F 16/9535 |
| 11,210,354 B1* | 12/2021 | Kadayam | ............. | G06Q 30/016 |

(Continued)

OTHER PUBLICATIONS

Matsumoto et al. (Matsumoto, Ego-state Estimation from short texts based on Sentence Distributed Representation), May 2017, International Journal of Advanced Intelligence vol. 9, No. 2, pp. 145-161. (Year: 2017).*

(Continued)

*Primary Examiner* — Lamont M Spooner
(74) *Attorney, Agent, or Firm* — Plager Schack LLP; Mark H. Plager; Stephen Hallberg

(57) ABSTRACT

A text-based egotism level detection system and a process for detecting egotism level in alpha-numeric textual information via artificial intelligence (AI), deep learning, and natural language processing (NLP) are disclosed. The text-based egotism level detection system and process for detecting egotism level in alpha-numeric textual information via AI, deep learning, and NLP detects egotism in text using a convolution neural network (CNN) for deep learning. The text-based egotism level detection system and process for detecting egotism level in alpha-numeric textual information via AI, deep learning CNN, and NLP builds, maintains, utilizes, and updates an egotism detection text language processing model that is generated from a huge amount of text data including sentences that are designated as egotistic sentences or not egotistic sentences based on a deep understanding of egotism and data science.

10 Claims, 5 Drawing Sheets

(56) References Cited

U.S. PATENT DOCUMENTS

| | | | |
|---|---|---|---|
| 2011/0208522 A1* | 8/2011 | Pereg | G06F 40/35 |
| | | | 704/235 |
| 2012/0166180 A1* | 6/2012 | Au | G06F 40/237 |
| | | | 704/9 |
| 2014/0108006 A1* | 4/2014 | Vogel | G06F 16/9535 |
| | | | 704/9 |
| 2015/0095917 A1* | 4/2015 | Challenger | G06F 9/5027 |
| | | | 718/104 |
| 2017/0212583 A1* | 7/2017 | Krasadakis | G06F 3/0482 |
| 2018/0060735 A1* | 3/2018 | Ganesh | G06Q 10/063112 |
| 2019/0130243 A1* | 5/2019 | Penubothula | G01C 21/3415 |
| 2019/0156222 A1* | 5/2019 | Emma | G06F 16/3329 |
| 2019/0325626 A1* | 10/2019 | Tao | G06F 40/106 |
| 2019/0349333 A1* | 11/2019 | Pickover | G06N 20/00 |
| 2020/0034432 A1* | 1/2020 | Jain | G06F 40/166 |
| 2020/0075040 A1* | 3/2020 | Provost | G06N 3/0454 |
| 2020/0134035 A1* | 4/2020 | Rakshit | G06F 16/9532 |
| 2020/0135225 A1* | 4/2020 | Vaughn | H04N 21/25891 |
| 2020/0251190 A1* | 8/2020 | Glasner | A61B 5/7257 |
| 2021/0073255 A1* | 3/2021 | Trillo Vargas | G06N 20/00 |
| 2021/0182493 A1* | 6/2021 | Dey | G06F 40/253 |
| 2021/0216560 A1* | 7/2021 | Power | G06F 40/30 |

OTHER PUBLICATIONS

Ji, Suicidal Ideation Detection in Online Social content, 2020, The University of Queensland espace.library.uq, pp. 1-87 (Year: 2020).*

Branitsky et al., The Common Approach to Determination of the Destructive Information Impacts and Negative Personal Tendencies of Young Generation Using the Neural Network, 2019: Intelligent Distributed Computing XII, pp. 1-16 (Year: 2019).*

* cited by examiner

☐ JOHN 9/1/2022
☐ JOHN 12/1/2022

1-FREQUENT ENTITIES IN TEXT
2-TEXT TENSE
3-PLURAL WORDS
4-INCLUSIVE PRONOUNS
5-READABILITY
6-SENTIMENT
7-TEXT EMOTION
8-EGOISTIC ENTITIES IN TEXT
9-NONEGOISTIC ENTITIES IN TEXT

TEXT-BASED EGOTISM LEVEL DETECTION SYSTEM AND PROCESS FOR DETECTING EGOTISM LEVEL IN ALPHA-NUMERIC TEXTUAL INFORMATION BY WAY OF ARTIFICIAL INTELLIGENCE, DEEP LEARNING, AND NATURAL LANGUAGE PROCESSING

BACKGROUND

Embodiments of the invention described in this specification relate generally to content evaluation systems, and more particularly, to text-based egotism level detection system and process for detecting egotism level in alpha-numeric textual information via artificial intelligence, deep learning, and natural language processing.

Egotism, as a character attribute or quality, has potential to strain, damage, or, when a high level of egotism is present, ruin personal relationships, businesses, or other types of interpersonal relationships. Egotism can exist for people, groups (teams, groups, etc.), and even non-human entities (business). Detecting the level of egotism and reducing it, in ourselves or our businesses, alleviates major personal suffering or business loss caused by egotism.

The field of artificial intelligence (AI) text analyzing (which can involve natural language processing and other artificial intelligence systems) is relatively new. AI and related text analysis-based technologies that exist presently do not target egotism. As such, technology that focuses on reducing egotism is under-served in existing, conventional options.

Other options for detecting levels of egotism include general self-help books and workshops, or professional services of humans, such as therapists, psychologists, psychiatrists, life advising professionals or coaches, etc. However, human-based therapy resources are limited and many do not have sufficient access to their expertise. Furthermore, such human-based options are time consuming and cannot provide immediate or near immediate feedback on written text. Yet, with so much textual communication that goes on in the world today, there is no way for most to obtain any clarity on the level of egotism in such text.

Therefore, what is needed is a way to detect egotism in text using AI.

BRIEF DESCRIPTION

A novel text-based egotism level detection system and a novel process for detecting egotism level in alpha-numeric textual information via AI, deep learning, and natural language processing (NLP) are disclosed. In some embodiments, the text-based egotism level detection system and process for detecting egotism level in alpha-numeric textual information via AI, deep learning, and NLP detects egotism in text using a convolution neural network (CNN) for deep learning.

In some embodiments, the text-based egotism level detection system and process for detecting egotism level in alpha-numeric textual information via AI, deep learning CNN, and NLP builds, maintains, utilizes, and updates an egotism detection text language processing model. In some embodiments, the egotism detection text language processing model is generated from a huge amount of text data comprising a plurality of sentences, each of which is designated as either an egotistic sentence or not egotistic sentence based on a deep understanding of egotism and data science.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 4 conceptually illustrates an example of an egotism visualization output for a user over a three-month period of time.

DETAILED DESCRIPTION

Figure 1:
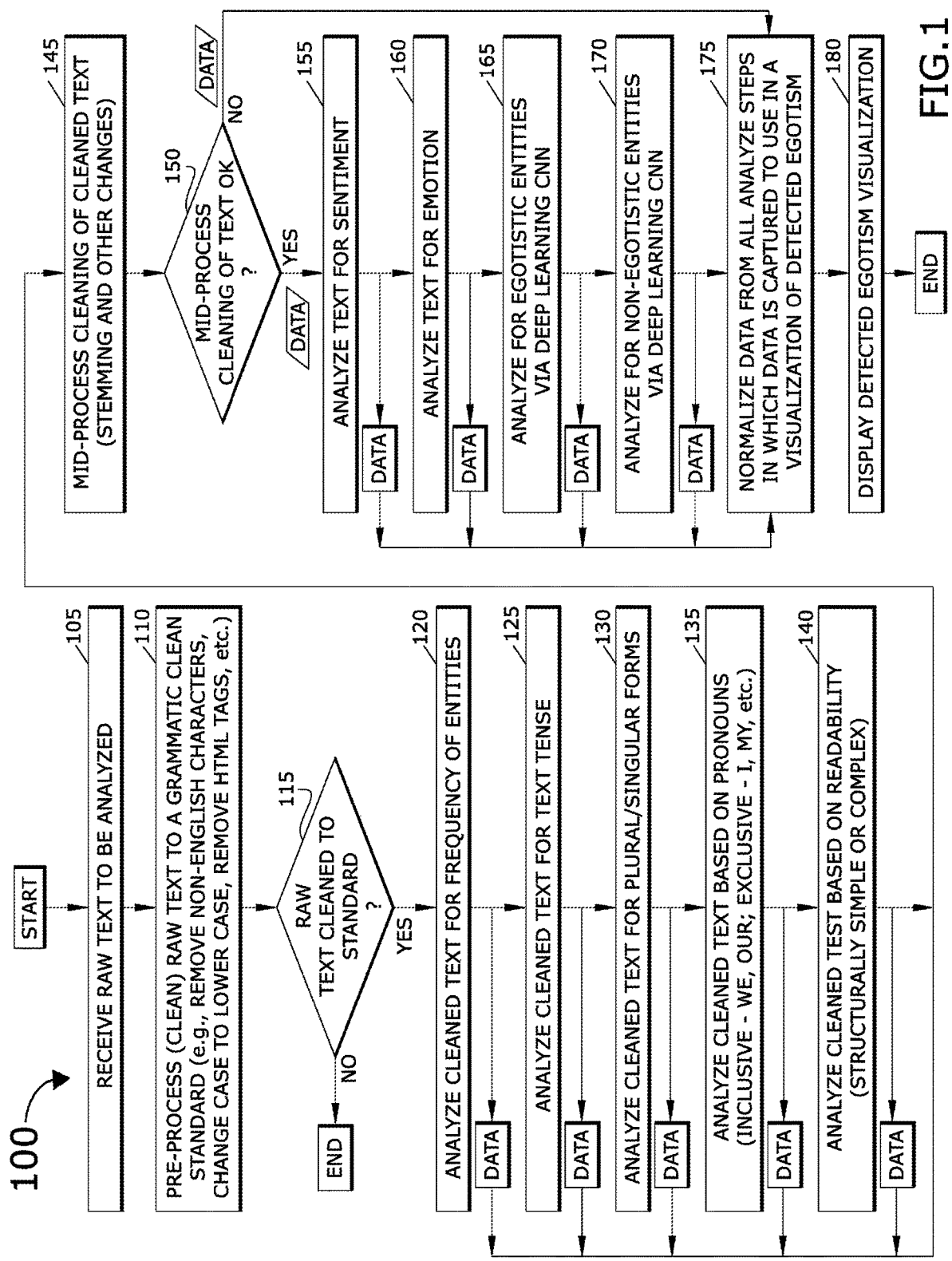
FIG. 1 conceptually illustrates a text-based egotism level detection process for detecting egotism level in alpha-numeric textual information via AI, deep learning, and NLP in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a novel text-based egotism level detection system and process for detecting egotism level in alpha-numeric textual information via AI, deep learning, and NLP. In some embodiments, the text-based egotism level detection system and process for detecting egotism level in alpha-numeric textual information via AI, deep learning, and NLP detects egotism in text using a CNN for deep learning. In some embodiments, the text-based egotism level detection system and process for detecting egotism level in alpha-numeric textual information via AI, deep learning, and NLP detects egotism in textual information provided in any language or writing system.

In some embodiments, the text-based egotism level detection system and process for detecting egotism level in alpha-numeric textual information via AI, deep learning CNN, and NLP builds, maintains, utilizes, and updates an egotism detection text language processing model. In some embodiments, the egotism detection text language processing model is generated from a huge amount of text data comprising a plurality of sentences, each of which is designated as either an egotistic sentence or not egotistic sentence based on a deep understanding of egotism and data science. In some embodiments, the CNN involves convolution operations between raw text input provided by users of the text-based egotism level detection system and parameters that express egotistic sentences and non-egotistic sentences that are included in a filter kernel that is configured according to the egotism detection text language processing model as adapted from a general language model based on the deep understanding of egotism and data science. In some embodiments, a convolution operation is performed in each of one or more convolution layers of the CNN.

As stated above, egotism has potential to strain, damage, or ruin personal relationships, businesses, or other types of interpersonal relationships. Detecting the level of egotism and reducing it, in ourselves or businesses, alleviates major personal suffering or business loss caused by egotism. The existing, conventional AI and text analysis-based technologies do not target egotism. As such, technology that focuses on reducing egotism is under-served by the existing, conventional options. Other options are not sufficient for most uses, since the other options include self-help books and workshops, or involve face-to-face interaction with a professional therapist or other qualified person to detect egotism level. They also cannot provide immediate or near immediate feedback on egotism in written text. Yet, with so much textual communication that goes on in the world today, there is no way for most to obtain any clarity on the level of egotism in such text. Embodiments of the text-based egotism level detection system and process for detecting egotism level in alpha-numeric textual information via AI, deep learning CNN, and NLP described in this specification solve such problems by analyzing raw text input (from user input, file upload and scanning of the text in the file, audible voice-based spoken word that is converted to text, etc.) using AI software that leverages the egotism detection text language processing model, in conjunction with the NLP and deep learning CNN to recognize patterns found in the text, and then showing the results of detected egotism in a visual representation that accounts for several parameters of egotism level. In this way, the text-based egotism level detection system and process for detecting egotism level in alpha-numeric textual information via AI, deep learning CNN, and NLP provides a way for users to understand their egotism level, and visually demonstrates the areas in which the user may work to reduce egotism level.

Embodiments of the text-based egotism level detection system and process for detecting egotism level in alpha-numeric textual information via AI, deep learning CNN, and NLP described in this specification differ from and improve upon currently existing options. In particular, some embodiments differ from current, conventional options, of which there are general self-help books and workshops, or professional therapists, coaches, etc., but nothing that directly targets egotism of an individual or professional in an immediate or near immediate way in the form of text analysis.

In addition, some embodiments of the text-based egotism level detection system and process for detecting egotism level in alpha-numeric textual information via AI, deep learning CNN, and NLP improve upon the currently existing options by providing a technological option toward impacting egotism. The new technology at the heart of the text-based egotism level detection system and process for detecting egotism level in alpha-numeric textual information via AI, deep learning CNN, and NLP involves a large amount of related data, which supports an excellent understanding of egotism. The data-detectable understanding of egotism is then processed and formed in technology solution-based ways to come up with the egotism model for detecting egotism in passages of alpha-numeric text. In some embodiments, the egotism model is generated based on a huge amount of alpha-numeric text data. In some embodiments, the alpha-numeric text data (in any language or writing system) is evaluated as sentences (or text fragments) which are determined to be either egotistic or not egotistic based on a deep understanding of egotism and data science.

The text-based egotism level detection system and process for detecting egotism level in alpha-numeric textual information via AI, deep learning CNN, and NLP of the present disclosure may be comprised of the following elements. This list of possible constituent elements is intended to be exemplary only and it is not intended that this list be used to limit the text-based egotism level detection system and process for detecting egotism level in alpha-numeric textual information via AI, deep learning CNN, and NLP of the present application to just these elements. Persons having ordinary skill in the art relevant to the present disclosure may understand there to be equivalent elements that may be substituted within the present disclosure without changing the essential function or operation of the text-based egotism level detection system and process for detecting egotism level in alpha-numeric textual information via AI, deep learning CNN, and NLP.

1. Pre-process the text to come up with a standard. For example, pre-processing the text to remove non-English characters, convert to all lower case, no HTML tags, etc.

2. Analyze the text for frequency of entities in the text. For example, entities in the text such as companies, people, nature and how many times repeated.

3. Analyze the text based on tense (present, past, future tense, and aspect of tense—perfect tense, progressive or continuous tense).

4. Analyze the text based on form, such as whether text includes plural noun forms, singular noun forms, plural or singular pronouns, etc.

5. Analyze the text based on pronoun usage, such as exclusive pronoun (I, my, you, yours) or inclusive pronoun usage (we, ours) in the text.

6. Analyze the text based on readability, such as the complexity of the sentence structure (e.g., more complex or simple in readability).

7. Analyze the text based on sentiment, such as being more positive or more negative.

8. Analyze the text based on emotion. For example, expressions of happiness, anger, sadness, wonder, and surprise in the text (among other emotions).

9. Analyze the text based on egotistic entities, based on a proprietary deep learning CNN model. The deep learning CNN model is trained with many hundreds of sentences in which words are used in both egotistic and in non-egotistic contexts.

10. Analyze the text based on non-egotistic entities, which is the opposite/reverse of the above. In this case, many hundreds of sentences are involved in the deep learning CNN model in which the words are used in both non-egotistic and then egotistic contexts.

11. Visually output (display) the results of all analyses conducted in relation to the text, and offer a suggested determination of egotism level for the text—that is, how egotistic the text is.

The text-based egotism level detection system and process for detecting egotism level in alpha-numeric textual information via AI, deep learning CNN, and NLP of the present disclosure generally works by isolating text patterns, which show more or less egotism in the text, based on a good, research-supported definition of egotism. Thus, the analysis steps (noted above) involve these patterns. For example, if a particular text passage has more inclusive language in the text and a more joyful text pattern, then the model shows more non-egotistic entities in the text, and the text passage is marked (or flagged) as being less egotistic by the text-based egotism level detection system and process for detecting egotism level in alpha-numeric textual information via AI, deep learning CNN, and NLP.

The text-based egotism level detection system and process for detecting egotism level in alpha-numeric textual information via AI, deep learning CNN, and NLP of some embodiments is based on an overall AI system that encompasses the deep learning CNN and NLP. The overall AI system itself is based on complex mathematical and logical processing from its lowest level and moving all the way up for both the NLP aspect and the deep learning CNN aspect. Yet, from a user perspective, the complexity is hidden, thereby enabling the user to easily interact with and use the text-based egotism level detection system and process for detecting egotism level in alpha-numeric textual information via AI, deep learning CNN, and NLP. For instance, one way to use the text-based egotism level detection system and process for detecting egotism level in alpha-numeric textual information via AI, deep learning CNN, and NLP to detect egotism is for the user to interact with tools and interfaces on a website (hosted by a cloud server or a front-end web server in connection with a cloud application server that hosts a cloud application service). An example of this is demonstrated in and described further below, by reference to FIG. 3. At the website, for example, the user may provide or input text (e.g., direct typing input, pasting a clipboard copied textual passage, or uploading a document or file with target text, etc.). Upon submitting the text (e.g., by the user pressing a website button to submit the text), the backend processors of the text-based egotism level detection system retrieve the submitted text and begin evaluating. In some embodiments, the backend processors of the text-based egotism level detection system comprise the model to use during egotism pattern evaluation and at least one software implementation of the process for detecting egotism level in alpha-numeric textual information via AI, deep learning CNN, and NLP. The software, including the model, analyzes the text and based on the analysis, outputs result of egotistic detection. The software may also output anonymous collective results of other users for comparison. In addition, the backend software may point out the areas that the user needs to work on, in order to reduce high levels of egotism in the written form. In some embodiments, the backend processors are accessible to users via mobile applications ("mobile apps") that run on mobile devices, web apps that run in standard browsers, or by distributed apps ("dApps") that are communicably connected to particular blockchain implementations for recording text-based egotism level detection in a distributed ledger.

To make the text-based egotism level detection system and process for detecting egotism level in alpha-numeric textual information via AI, deep learning CNN, and NLP of the present disclosure, a person would need to have a good understanding of egotism and a good understanding of data science, as a fundamental, starting point. The text-based egotism level detection system could be deployed as a cloud compute architecture, such as a software-as-a-service (SaaS) architecture, as a distributed ledger and blockchain implementation, or as any other cloud compute environment (e.g., a hybrid cloud application service, a platform service, etc.).

The person would also need to implement the process for detecting egotism level in alpha-numeric textual information via AI, deep learning CNN, and NLP as a software system. The software implementation of the process for detecting egotism level in alpha-numeric textual information via AI, deep learning CNN, and NLP may be based on the Python language, and may leverage associated Python-based NLP libraries, Python-based AI modules/machine learning modules or libraries. The person would also need to develop and aggregate a large (huge) data set of sentences and text fragments with egotism detection levels for the model. The larger the data set of sentences in the model, the more accurate the results, assuming the foundational knowledge of the person is present for this implementation. Also, the person would need to provide the data set dynamically, so that the data can aggregate ever-increasing sentences to build accurate models. As the data increases, the model becomes more and more accurate. For the patterns, the person may key in one pattern (step 2 to 10) at a time, test that pattern for the known and unknown levels of both egotistic and non-egotistic text. As a test is satisfactorily passed, then the person would move to the next pattern or step. The integration of NLP modules and deep learning CNN is not specific to any given NLP or CNN, but is adaptable to any of several existing and future NLP and CNN deep learning implementations. Furthermore, integration of any blockchain or distributed ledger is not limited to a particular blockchain implementation, but is adaptable (per smart contracts) for inclusion of any of several blockchain implementations and distributed ledger technologies. Additionally, the text-based egotism level detection system and process for detecting egotism level in alpha-numeric textual information via AI, deep learning CNN, and NLP is adaptable for use in supporting text in any language, whether Roman-alphabet based written text or a non-Roman based script or other written form (any writing system can be supported by adaptation of the underlying language model, which itself is extended and adapted for use in recognizing egotistic patterns in written language form).

To use the text-based egotism level detection system and process for detecting egotism level in alpha-numeric textual information via AI, deep learning CNN, and NLP of the present disclosure, a user may interact with interfaces to detect their own personal level of egotism. For instance, assume a user has a level of egotism that is causing problems in their relationships or business. Suppose the user is unaware of their level of egotism but would like to understand their level of egotism. By using the text-based egotism level detection system and process for detecting egotism level in alpha-numeric textual information via AI, deep learning CNN, and NLP of the present disclosure, the user can analyze their own text periodically to see whether improvements to their egotism level have occurred (based on past evaluations). This is as simple as the user accessing a website via computing device or using a mobile app on a mobile device to input and submit text for egotism level evaluation. The backend performs the hard work of evaluating user's text while the user waits for the results. Alternatively, the user has a listener application that runs as a background service on a computing device or mobile device, where the listener application detects when text is input on the device and captures the text for backend evaluation of the level of egotism in the text. While this usage is like being monitored for the level of egotism all the time, the user would not be aware of the monitoring in any particular obvious way, since the listener service runs as a background process, silently capturing text when input into another app or software interface (as authorized by the user and the other app or software for the listener service to attach to and for the user input text to be captured). The other app or software interface may be as simple as a text box app or software interface in which the user can input text and a simple visualization is output on the screen which points to the level of egotism in the text box, as provided.

For instance, one way to use the text-based egotism level detection system and process for detecting egotism level in alpha-numeric textual information via AI, deep learning CNN, and NLP to detect egotism is for the user to interact with tools and interfaces on a website (hosted by a cloud server or a front-end web server in connection with a cloud application server that hosts a cloud application service). An example of this is demonstrated in and described further below, by reference to FIG. 3. At the website, for example, the user may provide or input text (e.g., direct typing input, pasting a clipboard copied textual passage, or uploading a document or file with target text, etc.). Upon submitting the text (e.g., by the user pressing a website button to submit the text), the backend processors of the text-based egotism level detection system retrieve the submitted text and begin evaluating. In some embodiments, the backend processors of the text-based egotism level detection system comprise the model to use during egotism pattern evaluation and at least one software implementation of the process for detecting egotism level in alpha-numeric textual information via AI, deep learning CNN, and NLP. The software, including the model, analyzes the text and based on the analysis, outputs result of egotistic detection. The software may also output anonymous collective results of other users for comparison. In addition, the backend software may point out the areas that the user needs to work on, in order to reduce high levels of egotism in the written form. In some embodiments, the backend processors are accessible to users via mobile applications ("mobile apps") that run on mobile devices, web apps that run in standard browsers, or by distributed apps ("dApps") that are communicably connected to particular blockchain implementations for recording text-based egotism level detection in a distributed ledger.

By way of example, FIG. 1 conceptually illustrates a text-based egotism level detection process for detecting egotism level in alpha-numeric textual information via AI, deep learning, and NLP 100 in some embodiments. The text-based egotism level detection process for detecting egotism level in alpha-numeric textual information via AI, deep learning, and NLP 100 may be performed by a text-based egotism level detection cloud application service that is hosted by a cloud text-based egotism level detection software-as-a-service (SaaS) system.

As shown in this figure, the text-based egotism level detection process for detecting egotism level in alpha-numeric textual information via AI, deep learning, and NLP 100 starts by receiving raw text input to be analyzed (at 105). For example, a front-end web server may receive the raw text as input from a user of a computing device, such as a mobile app or a web browser on a computer. The raw text may be received in other ways, such as by the user pasting a clipboard copied textual passage, the user uploading a document or file with target text, a drag-and-drop operation, etc.

In some embodiments, the text-based egotism level detection process for detecting egotism level in alpha-numeric textual information via AI, deep learning, and NLP 100 pre-processes or cleans the raw text to come up to a standard (at 110). The standard may be a grammatically clean standard that is possible by removal of all non-English characters (or non-native language characters for other languages), conversion of all characters to lower case, removal of any HTML tags, etc. Next, the text-based egotism level detection process for detecting egotism level in alpha-numeric textual information via AI, deep learning, and NLP 100 determines (at 115) whether the raw text has been able to be cleaned to the standard or not. When the raw text has not been cleaned, the text-based egotism level detection process 100 ends.

On the other hand, when the raw text is determined (at 115) to have been cleaned to the standard, then the text-based egotism level detection process for detecting egotism level in alpha-numeric textual information via AI, deep learning, and NLP 100 analyzes the cleaned text for the frequency of entities (at 120) in the cleaned text. In some embodiments, the text-based egotism level detection process for detecting egotism level in alpha-numeric textual information via AI, deep learning, and NLP 100 searches for various entities in the text, such as companies, people, nature, etc., and also determines the number of times such entities are repeated in the cleaned text. The output of this analysis is provided as entity frequency analysis data results. The entity frequency analysis data results are stored in a buffer or memory for subsequent processing and normalization, which is further described below.

In some embodiments, the text-based egotism level detection process for detecting egotism level in alpha-numeric textual information via AI, deep learning, and NLP 100 analyzes the cleaned text for text tense (at 125). For example, the cleaned text is analyzed to determine use of present tense, past tense, future tense, as well as identification of the aspect of tense used in the cleaned text, namely, perfect tense, progressive or continuous tense, simple tense (no discernible aspect for the tense of language in the cleaned text). The output of this analysis is provided as text tense analysis data results. The text tense analysis data results are stored in a buffer or memory for subsequent processing and normalization, which is further described below.

In some embodiments, the text-based egotism level detection process for detecting egotism level in alpha-numeric textual information via AI, deep learning, and NLP 100 analyzes the cleaned text for plural-singular forms (at 130). For example, the cleaned text is analyzed to determine use of different forms, such as plural noun forms, singular noun forms, plural or singular pronoun usage, etc. The output of this analysis is provided as plural-singular forms analysis data results. The plural-singular forms analysis data results are stored in a buffer or memory for subsequent processing and normalization, which is further described below.

In some embodiments, the text-based egotism level detection process for detecting egotism level in alpha-numeric textual information via AI, deep learning, and NLP 100 analyzes the cleaned text for pronoun usage (at 135). For example, the analysis of cleaned text to identify any instances of pronouns in exclusive forms, such as 'I', 'my', 'you', 'yours', 'his', 'her', 'their', etc., and inclusive forms, such as 'we' or 'ours', etc. The output of this analysis is provided as pronoun usage analysis data results. The pronoun usage analysis data results are stored in a buffer or memory for subsequent processing and normalization, which is further described below.

In some embodiments, the text-based egotism level detection process for detecting egotism level in alpha-numeric textual information via AI, deep learning, and NLP 100 analyzes the cleaned text for readability (at 140). For example, an analysis of the complexity of the sentence structure for the cleaned text, whether the structure is relatively more complex or simple in readability according to a standard according to either or both of a standard language model and the adapted, custom egotism detection text language processing model. The output of this analysis is provided as readability analysis data results. The readability analysis data results are stored in a buffer or memory for subsequent processing and normalization, which is further described below.

In some embodiments, the text-based egotism level detection process for detecting egotism level in alpha-numeric textual information via AI, deep learning, and NLP 100 moves forward to mid-process cleaning of the cleaned text (at 145) which involves transitioning to stemming and other changes. In some embodiments, the text-based egotism level detection process for detecting egotism level in alpha-numeric textual information via AI, deep learning, and NLP 100 then determines (at 150) whether the mid-process cleaning of the cleaned text was successful or not. When the mid-process cleaning of the cleaned text (at 145) is determined (at 150) not to have succeeded, then the text-based egotism level detection process for detecting egotism level in alpha-numeric textual information via AI, deep learning, and NLP 100 provides the entity frequency analysis data results, the text tense analysis data results, the plural-singular forms analysis data results, the pronoun usage analysis data results, and the readability analysis data results for data normalization (at 175), which is further described below, and which is used to prepare the final results for visualization of detected egotism.

On the other hand, when the mid-process cleaning of the cleaned text (at 145) is affirmatively determined (at 150) to have succeeded, then the text-based egotism level detection process for detecting egotism level in alpha-numeric textual information via AI, deep learning, and NLP 100 maintains the buffered/memory stored entity frequency analysis data results, text tense analysis data results, plural-singular forms analysis data results, pronoun usage analysis data results, and readability analysis data results for subsequent data normalization (at 175), while presently moving forward to a step for analyzing the mid-process cleaned text for sentiment (at 155). For example, the mid-process cleaned text is analyzed to determine positive tone or negative tone. The output of this mid-process cleaned text analysis is provided as sentiment analysis data results. The determination of positive or negative tone is analyzed by the process for detecting egotism level in alpha-numeric textual information via AI, deep learning, and NLP 100 of some embodiments along a relative scale, where the sentiment data analysis results may demonstrate text that is relatively more positive or relatively more negative than a standard, according to either or both of the standard language model and the adapted, custom egotism detection text language processing model. Whether relative scale or absolute determination, the sentiment analysis data results are stored in a buffer or memory for subsequent processing and data normalization (at 175), which is further described below.

In some embodiments, the text-based egotism level detection process for detecting egotism level in alpha-numeric textual information via AI, deep learning, and NLP 100 analyzes the mid-process cleaned text for emotion (at 160). For example, expressions of happiness, anger, sadness, and so forth, are searched for in the mid-process cleaned text. The output of this mid-process cleaned text analysis is provided as emotion analysis data results. The emotion analysis data results are stored in a buffer or memory for subsequent processing and data normalization (at 175), which is further described below.

In some embodiments, the text-based egotism level detection process for detecting egotism level in alpha-numeric textual information via AI, deep learning, and NLP 100 analyzes the mid-process cleaned text for egotistic entities (at 165) via the deep learning CNN. In some embodiments, the deep learning CNN is a propriety deep learning CNN model that is trained with many hundreds or thousands of sentences in which words are used in both egotistic and in non-egotistic contexts. A high-level example of what this step for analyzing the mid-process cleaned text for egotistic entities (at 165) involves would be identifying those egotistic entities in connection with those sentences in the egotistic context. In a more detailed, deeper sense, however, the deep learning CNN may include several convolution layers requiring a convolution operation to be performed for the analysis at each layer. In this sense, the step for analyzing the mid-process cleaned text for egotistic entities (at 165) may be recursive and only complete upon performing the convolution operation at each of the layers in the deep learning CNN. Furthermore, this step for analyzing the mid-process cleaned text for egotistic entities (at 165) may result in complex data output that reflects multiple layers of output for the convolution operation performed per layer, and only reconcile the output after processing of all layers is completed. Nevertheless, the output of this mid-process cleaned text analysis is provided as egotistic entities deep learning CNN analysis data results. The egotistic entities deep learning CNN analysis data results are stored in a buffer or memory for subsequent processing and data normalization (at 175), which is further described below.

In some embodiments, the text-based egotism level detection process for detecting egotism level in alpha-numeric textual information via AI, deep learning, and NLP 100 analyzes the mid-process cleaned text for non-egotistic entities (at 170) via the deep learning CNN. The step for analyzing the mid-process cleaned text for non-egotistic entities (at 170) is the opposite or reverse of the step for analyzing the mid-process cleaned text for egotistic entities (at 165), described above. As in the case for analyzing the text for egotistic entities, the step for analyzing the mid-process cleaned text for non-egotistic entities (at 170) involves comparison and intelligent analysis of many hundreds or thousands of sentences, text fragments, and so forth, that are used in both non-egotistic contexts. In the more detailed, expansive sense, this may be as complex as the analysis for egotistic entities (at 165) to perform convolution operations at every layer among several convolution layers of the deep learning CNN. As in the analysis cases above, the output of this mid-process cleaned text analysis is provided as non-egotistic entities deep learning CNN analysis data results. The non-egotistic entities deep learning CNN analysis data results are stored in a buffer or memory for subsequent processing and data normalization (at 175), which is further described below.

In some embodiments, the text-based egotism level detection process for detecting egotism level in alpha-numeric textual information via AI, deep learning, and NLP 100 then proceeds to the data normalization step (at 175). In particular, the text-based egotism level detection process for detecting egotism level in alpha-numeric textual information via AI, deep learning, and NLP 100 normalizes the data from all analysis steps in which data was captured and temporarily stored in a buffer or memory including the entity frequency analysis data results (from analysis at step 120), the text tense analysis data results (from analysis at step 125), the plural-singular forms analysis data results (from analysis at step 130), the pronoun usage analysis data results (from analysis at step 135), the readability analysis data results (from analysis at step 140), the sentiment analysis data results (from analysis at step 155), the emotion analysis data results (from analysis at step 160), the egotistic entities deep learning CNN analysis data results (from analysis at step 165), and the non-egotistic entities deep learning CNN analysis data results (from analysis at step 170).

The normalized data from all the analysis steps is then used to generate a visualization of detected egotism (or "detected egotism visualization"). In some embodiments, the text-based egotism level detection process for detecting egotism level in alpha-numeric textual information via AI, deep learning, and NLP 100 displays the detected egotism visualization (at 180) for the user to view. In some embodiments, the detected egotism visualization is transmitted as a model to the computing device of the user for rendering on a screen of the computing device in the visualized form. Then the text-based egotism level detection process for detecting egotism level in alpha-numeric textual information via AI, deep learning, and NLP 100 ends.

While the steps of the text-based egotism level detection process for detecting egotism level in alpha-numeric textual information via AI, deep learning, and NLP 100 described above are demonstrated in a sequential form, other orders of processing the steps are supported. Specifically, the step for mid-process cleaning of the cleaned text (at 145) of the text-based egotism level detection process for detecting egotism level in alpha-numeric textual information via AI, deep learning, and NLP 100 in some embodiments starts upon determining (at 115) that the raw text has been cleaned to the standard, and continues forward through subsequent steps that are performed in parallel with the steps for analyzing the cleaned text for the frequency of entities (at 120), analyzing the cleaned text for text tense (at 125), analyzing the cleaned text for plural-singular forms (at 130), analyzing the cleaned text for pronoun usage (at 135), and analyzing the cleaned text for readability (at 140).

Figure 2:
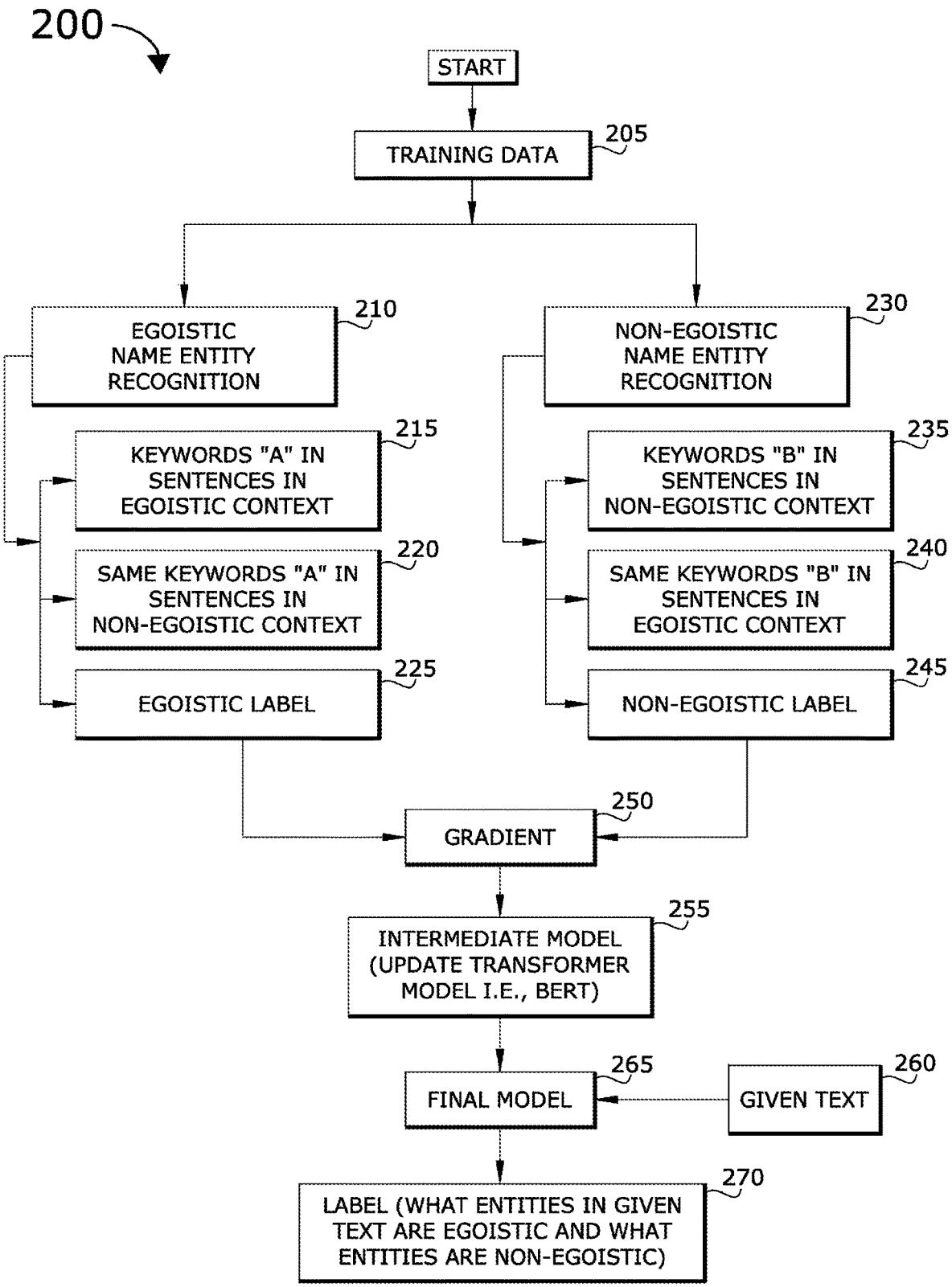
FIG. 2 conceptually illustrates an artificial intelligence (AI) entity recognition and deep learning model process for model creation, training, and updating to detect egotism level in alpha-numeric textual information in some embodiments FIG. 3 conceptually illustrates an architecture of a text-based egotism level detection system in some embodiments.

Turning to another process, FIG. 2 conceptually illustrates an artificial intelligence (AI) entity recognition and deep learning model process 200 for model creation, training, and updating to detect egotism level in alpha-numeric textual information in some embodiments. As shown in this figure, the artificial intelligence (AI) entity recognition and deep learning model process 200 starts with training data (at 205) which includes several hundred or thousands of sentences, text fragments, and other language constructs that are designated as egotistic sentences or non-egotistic sentences.

In some embodiments, the AI entity recognition and deep learning model process 200 performs two lines of analysis, namely, an egotistic name entity recognition (at 210) analysis and a non-egotistic name entity recognition (at 230) analysis. Starting with by the egotistic name entity recognition (at 210) analysis, the AI entity recognition and deep learning model process 200 evaluates keywords "A" in sentences in an egotistic context (at 215). The keywords "A" includes a plurality of keywords that is not limited. Thus, there may be hundreds or thousands of keywords "A" to evaluate. Next, the AI entity recognition and deep learning model process 200 evaluates the same keywords "A" in sentences in a non-egotistic context (at 220). Based on the evaluations of the keywords "A" in both the egotistic context (at 215) and the non-egotistic context (at 220), the AI entity recognition and deep learning model process 200 then determines and provides an egotistic label (at 225) that is provided to a gradient (at 250) in connection with other labels for an intermediate model (at 255) that updates an associated transformer model of the general language model (e.g., a "BERT" language model).

On the non-egotistic name entity recognition (at 230) analysis side, the AI entity recognition and deep learning model process 200 evaluates keywords "B" in sentences in the non-egotistic context (at 235). Like the keywords "A", the keywords "B" include a plurality of keywords that is not limited in any way. Thus, there may be hundreds or thousands of keywords "B" to evaluate. Next, the AI entity recognition and deep learning model process 200 evaluates the same keywords "B" in sentences in the egotistic context (at 240). Based on the evaluations of the keywords "B" in both the non-egotistic context (at 235) and the egotistic context (at 240), the AI entity recognition and deep learning model process 200 then determines and provides a non-egotistic label (at 245) that is provided to the gradient (at 250) in connection with other labels (such as the egotistic labels) for the intermediate model (at 255) to update the associated transformer model of the general language model (the "BERT" language model).

While the egotistic name entity recognition (at 210) analysis and the non-egotistic name entity recognition (at 230) analysis may be performed repeatedly for several words (sequentially and/or recursively processing all words in the training data), the AI entity recognition and deep learning model process 200 of some embodiments proceeds to generate and/or update the final model (at 265). The final model (or "egotism detection text language processing model") is adapted from the general language model (intermediate model) to focus the egotism aspects within text described in the present disclosure. Accordingly, AI entity recognition and deep learning model process 200 utilizes the final model (at 265) to evaluate some given text (at 260), such as raw text input by a user, text captured within a text document, voice/audio data converted to text by a speech-to-text processor, etc. In this way, the AI entity recognition and deep learning model process 200 is able to label (at 270) the given text according to which entities in the given text are egotistic entities and which entities in the given text are non-egotistic entities.

Figure 3:
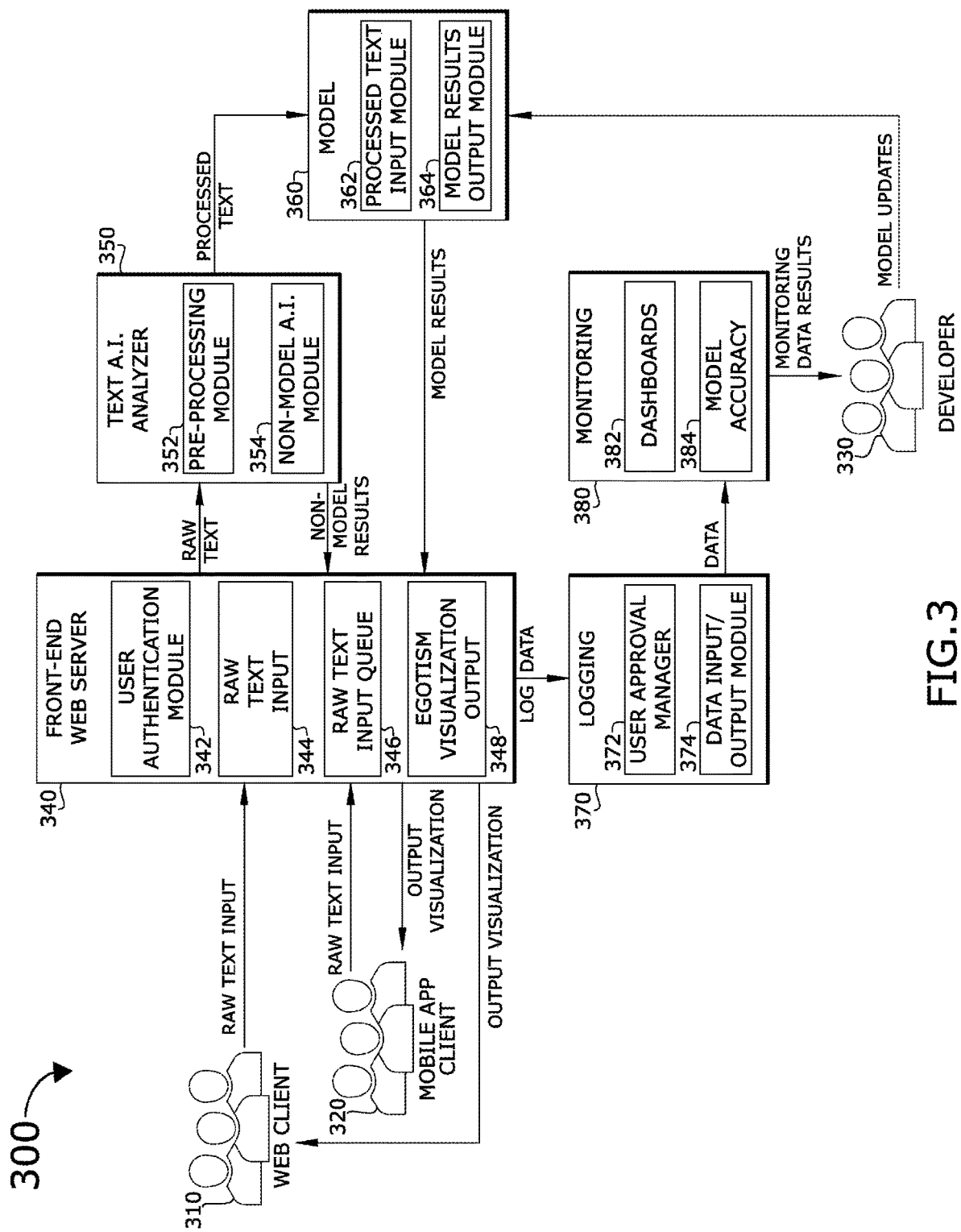

By way of example, FIG. 3 conceptually illustrates an architecture of a text-based egotism level detection system 300 in some embodiments. As shown in this figure, the text-based egotism level detection system 300 involves several users included one or more web clients 310 (hereinafter referred to as the "web client user 310"), one or more mobile app clients 320 (hereinafter referred to as the "mobile app client user 320"), and one or more developers 330 (hereinafter referred to as the "developer 330"). In particular, the text-based egotism level detection system 300 is a cloud-based system to which the several users connect over the Internet.

As shown in this figure, the text-based egotism level detection system 300 comprises a front-end web server 340, a text artificial intelligence (AI) analyzer 350, an egotism detection text language processing model 360, a logging system 370, and a monitoring system 380. The front-end web server 340 provides a user interface and connection point for the web client user 310 and the mobile app client user 320. Specifically, the front-end web server 340 comprises a user authentication module 342 that is configured to authenticate the web client user 310 and the mobile app client user 320 (and other authorized users) when they connect to the front-end web server 340. The front-end web server 340 further comprises a raw text input interface 344 that is configured to allow the web client user 310, the mobile app client user 320, and other authorized and authenticated users to input raw text in a request for the text to be analyzed for egotism level. In connection with the raw text input interface 344, the front-end web server 340 further comprises a raw text input queue 346 that is configured to receive the raw text input provided by the web client user 310, the mobile app client user 320, and other authorized and authenticated users through the raw text input interface 344. In some embodiments, the raw text input queue 346 is also configured to temporarily store the raw text input received from through distinct and separate requests and separately provide the raw text input separately from the separate requests for encapsulated, non-interfering egotism level analysis. In addition to the user authentication module 342, the raw text input interface 344, and the raw text input queue 346, the front-end web server 340 further comprises an egotism visualization output module 348 that is configured to generate a visualization of detected egotism corresponding to a particular text input provided by a particular user (either the web client user 310, the mobile app client user 320, or another authorized and authenticated user). The egotism visualization output module 348 is further configured to visually output the generated visualization of detected egotism corresponding to the particular text input and transmit the visual output to a computing device that is exclusively connected to the user who input or provided the corresponding particular text input. In some embodiments, the front-end web server 340 is configured to manage exclusive data transmission to corresponding users by maintaining unique session clients associated with each authenticated user login and connection.

In some embodiments, the text AI analyzer 350 comprises a pre-processing module 352 and a non-model AI module 354. In some embodiments, the pre-processing module 352 is configured to perform pre-processing of the raw text input by the user into the raw text input interface 344 and received by the raw text input queue 346. In some embodiments, the pre-processing module 352 cleans the raw text and the non-model AI module 354 returns non-model results.

In some embodiments, when the egotism detection text language processing model 360 receives the cleaned, processed text from the text AI analyzer 350 after the pre-processing module 352 cleans up the text. In some embodiments, the egotism detection text language processing model 360 includes a processed test input module 362 that is configured to receive the processed text and a model results output module 364 that is configured to provide the model results to the egotism visualization output module 348 of the front-end web server 340. In this way, the visualization output module 348 can generate the visualization of detected egotism corresponding to a particular text input provided by the particular user and overlay the results of a current raw text analysis with a past raw text analysis requested by the particular user (who is identifiable based on user authentication). An example of an egotism visualization output for a user over a three-month period of time is described below, by reference to FIG. 4.

In some embodiments, the logging system 370 comprises a user approval manager 372 and a data input/output module 374. In some embodiments, the logging system 370 is configured to receive raw text input and model results from the front-end web server 340 via the data input/output module 374 when the particular user has permitted logging of the user's data. The permissions for logging the data of the particular user or any other user is handled by the user approval manager 372. In some embodiments, the user approval manager 372 retrieves user settings which either permit or deny access to the user data for logging. In some embodiments, each user is enabled to configure the user settings according to their needs. In some embodiments, when user data is logged by the logging system 370, the logged data is encrypted and persisted in a database (not shown in this figure) or a blockchain (not shown in this figure). In some embodiments, the data input/output module 374 is further configured to transmit the user logging data to the monitoring system 380.

In some embodiments, the monitoring system 380 comprises one or more dashboards 382 and a model accuracy engine 384. In some embodiments, the dashboards 382 are configured to allows the developer 330 to view data analysis of how accurate the model results are based on the model accuracy engine 384 processing the received user logging data. In this way, the developer 330 is able to tweak the model, provide model updates, etc., in order to retrain the model and enhance the accuracy of the model in its ability to discern egotism level based on any text input. Any and all model updates at then provided to the egotism detection text language processing model 360 to update, fine-tune, or otherwise retrain.

By way of example, FIG. 4 conceptually illustrates an example of an egotism visualization 400 output for a user over a three-month period of time. As shown in this figure, the egotism visualization 400 pertains to a user named "John" and records egotism along nine aspects including frequency of entities in text input, text tense, plural words, inclusive pronouns, readability, sentiment, emotion, egotistic entities in the text, and non-egotistic entities in the text. The egotism visualization 400 shown in this figure demonstrates the egotism level of "John" at a first date ("9/1/2022") and then a different egotism level of "John" at a second, later date ("12/1/2022"). In this way, the user "John" can see overall reductions in egotism, as well as the specific aspects in which egotism was reduced from the first date to the second date.

In addition to the above examples, it is noted here that the text-based egotism level detection system and process for detecting egotism level in alpha-numeric textual information via AI, deep learning CNN, and NLP can be adapted for use in detecting low egotism. At least one area of interest with a low level of egotism in a person is that lower egotism levels may advantageously lead to less mental health issues. Therefore, the text-based egotism level detection system and process for detecting egotism level in alpha-numeric textual information via AI, deep learning CNN, and NLP can be adapted to the detection of low egotism or directed to lowering egotism in connection with existing applications and systems that are focused on other mental health issues people may have. Additionally, the text-based egotism level detection system and process for detecting egotism level in alpha-numeric textual information via AI, deep learning CNN, and NLP can be adapted to capture audio, such as a person vocalizing sentences to be evaluated for detection of egotism level. In this case, the audio processing aspect would involve integration of an audio-to-text module (or speech-to-text processor) to translate the vocalized sentences and words into textual sentences and words, for backend analysis and detection of egotism level.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute/perform the operations of the software programs.

Figure 5:
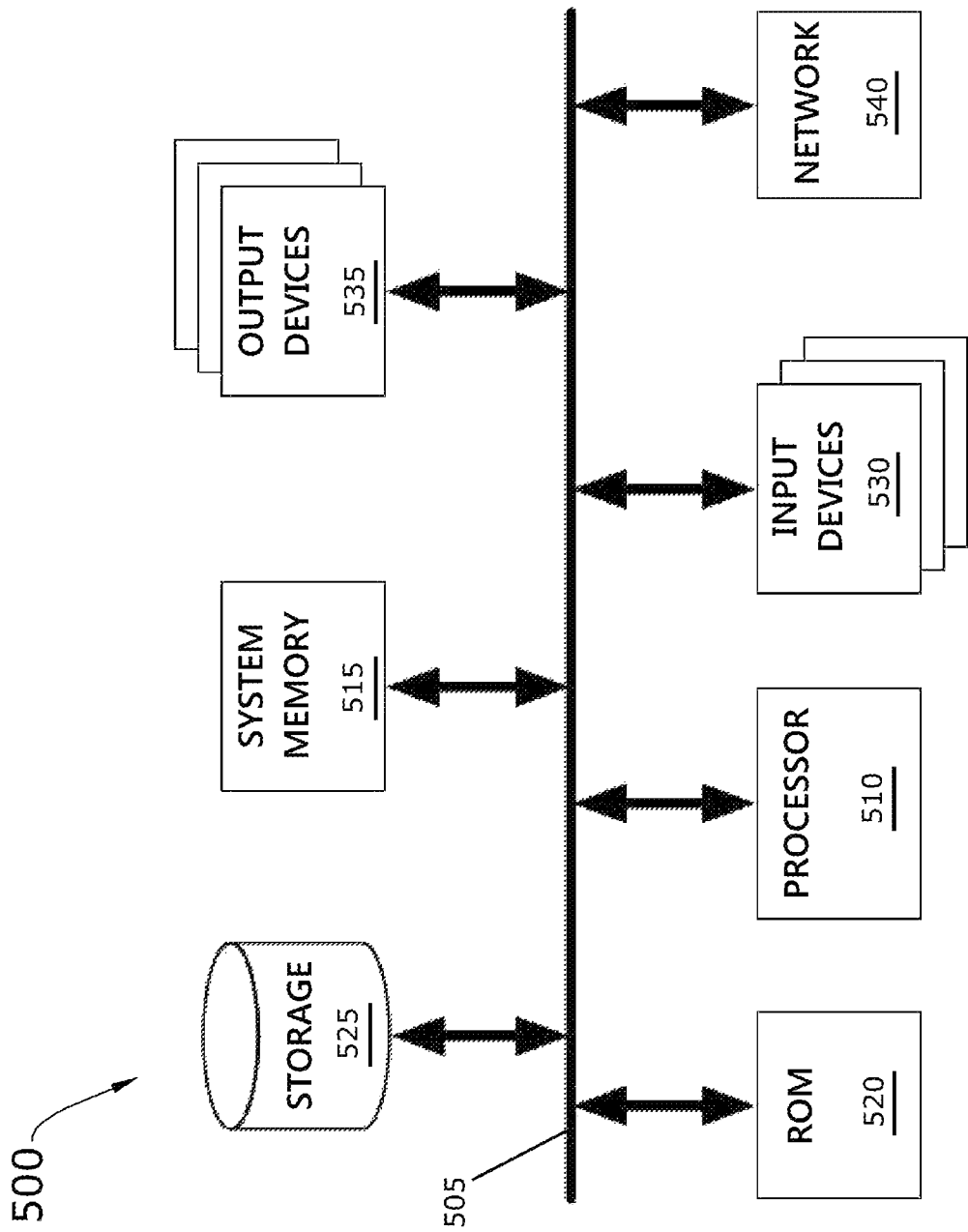
FIG. 5 conceptually illustrates an electronic system with which some embodiments of the invention are implemented.

FIG. 5 conceptually illustrates an electronic system 500 with which some embodiments of the invention are implemented. The electronic system 500 may be a computer (such as a desktop computer, a laptop computer, a single board computer, a server, etc.), phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525. From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. For example, the various memory units include instructions for temporarily storing the data output at each analysis stage in accordance with some embodiments, such as by the analysis steps described above, by reference to FIG. 1. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as liquid crystal displays (LCD) and organic light emitting diode (OLED) displays. Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet).

These functions described above can be implemented in digital electronic circuitry, in computer software, firmware or hardware, and/or other electronic components, such as microprocessors, storage and memory that store computer program instructions in a machine-readable or computer-readable medium (alternatively referred to as non-transitory computer-readable media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1 and 2 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Thus, one of ordinary skill in the art would understand that the invention is not to be limited by the foregoing illustrative details, but rather is to be defined by the appended claims.

I claim:

1. A text-based egotism level detection process for detecting egotism level in alpha-numeric textual information comprising:

pre-processing raw text to come up with a standard resulting in clean text to analyze along a plurality of egotism points, wherein the plurality of egotism points comprise no less than five egotism points and up to nine egotism points;

analyzing the clean text to identify entities in the clean text and determine a frequency of the identified entities in the clean text;

analyzing the clean text based on tense;

analyzing the clean text based on noun and pronoun form, wherein the noun and pronoun form comprises a plural noun and pronoun form and a singular noun and pronoun form;

analyzing the clean text based on pronoun usage, wherein pronoun usage comprises exclusive pronoun usage in the clean text and inclusive pronoun usage in the clean text;

analyzing the clean text based on readability;

re-processing the clean text to remove stemming;

analyzing the re-processed clean text based on sentiment;

analyzing the re-processed clean text based on emotion;

analyzing the re-processed clean text based on egotistic entities;

analyzing the re-processed clean text based on non-egotistic entities; and visually outputting an egotism level based on analysis results that provide a normalized value for each of the plurality of egotism points.

2. The text-based egotism level detection process of claim 1, wherein pre-processing the raw text comprises removing non-English characters, converting all characters in the raw text to lower case, and removing HTML, tags from the raw text.

3. The text-based egotism level detection process of claim 1, wherein the entities to identify in the clean text comprise companies, people, and nature, wherein the frequency of the identified entities is determined based on a count of instances of each entity identified in the clean text.

4. The text-based egotism level detection process of claim 1, wherein analyzing the clean text based on tense comprises:

identifying present tense, past tense, and future tense within the clean text; and determining an aspect of tense of tense comprising at least one of perfect tense, progressive tense, continuous tense, and simple tense.

5. The text-based egotism level detection process of claim 1, wherein analyzing the re-processed clean text based on egotistic entities and analyzing the re-processed clean text based on non-egotistic entities is based on a proprietary deep learning convolution neural network (CNN) model.

6. The text-based egotism level detection process of claim 5, wherein the proprietary deep learning CNN model comprises an egotism detection text language processing model that is generated by adapting a natural language model based on a plurality of sentences and words used in both egotistic and non-egotistic contexts, wherein the plurality of sentences and words train the natural language model to generate the egotism detection text language processing model.

7. The text-based egotism level detection process of claim 1, wherein analyzing the re-processed clean text based on sentiment comprises analyzing a sentiment tone of the re-processed clean text, wherein the sentiment tone is analyzed on a relative scale between an entirely positive sentiment and an entirely negative sentiment.

8. The text-based egotism level detection process of claim 1, wherein analyzing the re-processed clean text based on emotion comprises analyzing the re-processed clean text for expressions of emotion comprising happiness, sadness, anger, wonder, and surprise.

9. A text-based egotism level detection system that detects egotism level in alpha-numeric textual information via a non-model artificial intelligence (AI) module, a deep learning convolution neural network (CNN), and natural language processing (NLP), said text-based egotism level detection system comprising:

a front-end web server comprising a user authentication module, a raw text input interface, a raw text input queue, and an egotism visualization output module that is configured to generate an egotism level visualization to display for a user comprising one of a web client user and a mobile app client user, wherein the user authentication module is configured to authenticate the web client user and the mobile app client user upon network connection by at least one of a computing device of the web client user to the front-end web server and a mobile device of the mobile app client user to the front-end web server, wherein the raw text input interface is configured to receive raw text input to analyze for egotism level, wherein the raw text input queue orders requests for egotism level analysis according to a time of receiving the raw text input by the raw text input interface;

a text AI analyzer comprising a raw text pre-processing module and a non-model AI module, wherein the raw text pre-processing module is configured to receive the raw text associated with a request for egotism level analysis from the raw text input queue and clean the raw text to a clean text standard to analyze along a plurality of egotism points, wherein the plurality of egotism points comprise no less than five egotism points and up to nine egotism points, wherein the non-model AI module is configured to derive non-model text analysis results and provide the non-model text analysis results to the egotism visualization output module for generation of the egotism level visualization;

a deep learning convolution neural network (CNN) comprising an egotism detection text language processing model that performs natural language processing (NLP) and is based on a general language processing model adapted and trained according to a plurality of sentences and words used in both egotistic and non-egotistic contexts, wherein the egotism detection text language process model of the CNN is configured to (i) analyze clean text resulting from the raw text cleaning by the raw text pre-processing module to identify entities in the clean text and determine a frequency of the identified entities in the clean text, (ii) analyze the clean text based on tense, (iii) analyze the clean text based on both a plural noun and pronoun form and a singular noun and pronoun form, (iv) analyze the clean text based on both exclusive pronoun usage in the clean text and inclusive pronoun usage in the clean text, (v) analyze the clean text based on readability, (vi) receive re-processed clean text from the text AI analyzer after the text AI analyzer re-processes the clean text to remove stemming, (vii) analyze the re-processed clean text based on sentiment, (viii) analyze the re-processed clean text based on emotion, (ix) analyze the re-processed clean text based on egotistic entities, and (x) analyze the re-processed clean text based on non-egotistic entities;

a processed text input module that is configured to receive processed clean text from the text AI analyzer after the raw text pre-processing module cleans the raw text to the clean text standard and provide the received processed clean text as clean text to the deep learning convolution neural network (CNN) for analysis in connection with the egotism detection text language processing model; and a model results output module that is configured to provide model results of the analysis of the processed clean text and the re-processed clean text in relation to the egotism detection text language processing model to the egotism visualization output module for generation of the egotism level visualization in combination with the non-model text analysis results, wherein the model results output module is further configured to visually output the egotism level visualization and the non-model text analysis results which provides a normalized value for each of the plurality of egotism points.

10. The text-based egotism level detection system of claim 9 further comprising:

a logging system comprising a user approval manager and a data input-output module, wherein the user approval manager that is configured to perform logging of text analysis on a user-by-user basis according to a permission setting of the user, permit and deny logging of text analysis on a user-by-user basis, wherein the data input-output module is configured to receive data for logging from the egotism visualization output module when the permission setting of the corresponding user is set to permit logging; and a monitoring system comprising developer dashboards and a model accuracy engine that is configured to process logging data received from the data input-output module of the logging system and determine whether the egotism detection text language processing model is not accurate, wherein the determination of whether the egotism detection text language processing model is not accurate is visually output onto the onto the developer dashboards to inform a developer user of inaccuracies in the egotism detection text language processing model, wherein the developer user provides model updates to the egotism detection text language processing model based on the inaccuracies.

* * * * *